March 17, 1964 G. B. LINDERMAN ETAL 3,125,682
AUTOMATICALLY POSITIONED LIGHT SHIELD
FOR PHOTOSENSITIVE PINHOLE DETECTOR
Filed Nov. 15, 1962

INVENTORS
GARRETT B. LINDERMAN &
HARRY T. GIBSON

BY Raymond W. Cotton
ATTORNEY

United States Patent Office 3,125,682
Patented Mar. 17, 1964

3,125,682
AUTOMATICALLY POSITIONED LIGHT SHIELD FOR PHOTOSENSITIVE PINHOLE DETECTOR
Garrett B. Linderman, Washington, D.C., and Harry T. Gibson, Silver Spring, Md., assignors to Linderman Engineering Company, Inc., a corporation of Maryland
Filed Nov. 15, 1962, Ser. No. 237,878
6 Claims. (Cl. 250—219)

This invention relates to an improved light shield for pinhole detectors.

In view of the very small openings that must be sensed in connection with the detection of pinholes in tin plate to satisfy present day requirements, the sensitivity of the apparatus has become so high that false marking due to light leakage has become a problem of major importance. In connection with light shields of the type disclosed by the patents to Hags, No. 2,395,181, dated February 19, 1946, and Linderman, No. 2,820,908, dated January 21, 1958, positioning of the light shields has depended upon mechanical engagement with the edges of the work. Whereas such mechanical sensing of the edges is feasible where the gauge of the tin plate is sufficiently large to resist damage, where thinner materials are used, they will not withstand the forces imposed by such mechanical engagement without severely damaging the material undergoing inspection. There have been various attempts in the past to solve this problem by sensing the edges of the strip material photoelectrically and by jets of air. An example of the photoelectric sensing arrangement is disclosed in the patent to Larew et al., No. 2,981,845, dated April 25, 1961. Wherever photoelectric sensing is employed, the light source is subject to vibration and breakage, there remains a very definite sensitivity to ambient light conditions and the sensitivity is adversely affected by any dust or smoke that might be present. Moreover, it is highly desirable to obtain a more rapid response than is provided by the use of photoelectric cells or air jets so as to achieve a higher sensitivity and speed of response for a given cost.

It is among the objects of the present invention to provide in combination with a pinhole detector having a frame providing a path to be traversed by a strip of metal and having a light source and a light sensitive device substantially aligned on opposite sides of the path; a light shield transversely movably mounted with respect to the path, a reversible motor carried by the frame, means connecting the motor in driving relationship with the shield to impart movement to the shield, an electrical circuit including the motor and a variable source of energy, flux producing and sensing means carried by the shield proximate to an edge of the strip, and a circuit including the sensing means controlling the source of energy to produce movement of the shield transversely of the path as a function of variations in flux produced by variations in the position and structure of the strip.

The flux producing and sensing means may include an inductance energized to produce magnetic flux, which inductance may be included in an oscillator circuit. Such oscillator circuit and a stabilized oscillator may have outputs connected to a mixer having an output determining the speed and direction of movement of the motor. Such an oscillator circuit will preferably operate at a frequency selected from the range of from 1 to 60 megacycles, within which range, frequencies of from 3 to 6 megacycles have proved to be particularly advantageous.

A more complete understanding of the invention will follow from a description of the accompanying drawings wherein.

Figure 1:
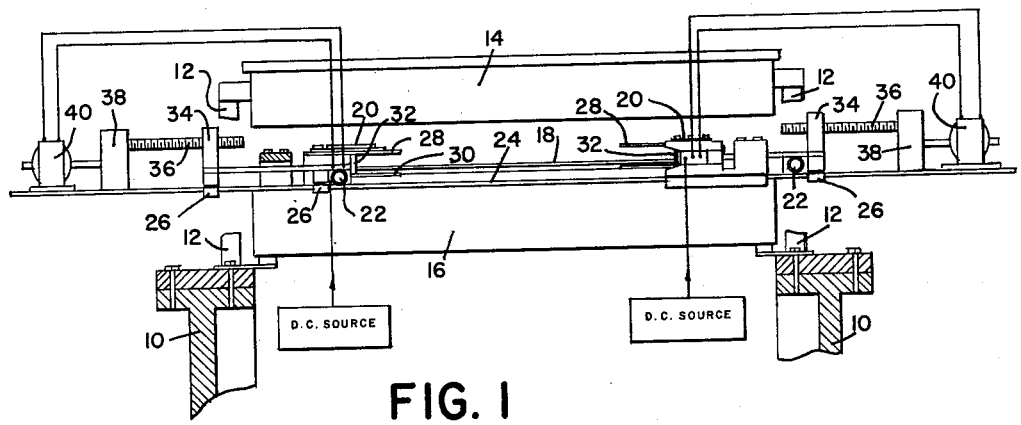
FIG. 1 is a fragmentary elevation, partially in section, depicting the application of the light shield of the present invention to a pinhole detector.

The pinhole detector is supported on a frame 10 by means of suitable brackets 12 and includes a light source housing 14 and a photosensitive device housing 16 disposed in alignment on opposite sides of a path 18 traversed by the metal strip to be inspected. A pair of carriages 20 are provided with rollers 22 engaging a track 24 for movement transversely of the path traversed by the metal strip undergoing inspection. To avoid undesirable movement in the direction of the traveling metal strip, the carriages 20 are provided with rollers 26 rotatable about vertical axes for engagement with the vertical surfaces of the track 24.

Each carriage is provided with an upper plate 28 and a lower plate 30 overlying the strip material, but containing aligned medial slots, not shown, extending almost to the edges of the strip material to enable the detection of pin holes located near the edges of the strip. These plates 28 and 30 and the portions of the carriages adjacent thereto constitute the light shields which prevent the ambient light from reaching the photosensitive devices within the housing 16. Each carriage or light shield is provided with a head 32 adjacent the proximate edge of the strip undergoing inspection, each head serving to maintain a predetermined position of its carriage relative to the edge of the strip without requiring actual physical engagement.

Transverse movement is imparted to each carriage by means of a nut 34 secured to the carriage and receiving a screw 36 driven by a reduction gear assembly 38 carried by the frame, which is in turn driven by a motor 40 supported by the frame.

Figure 3:
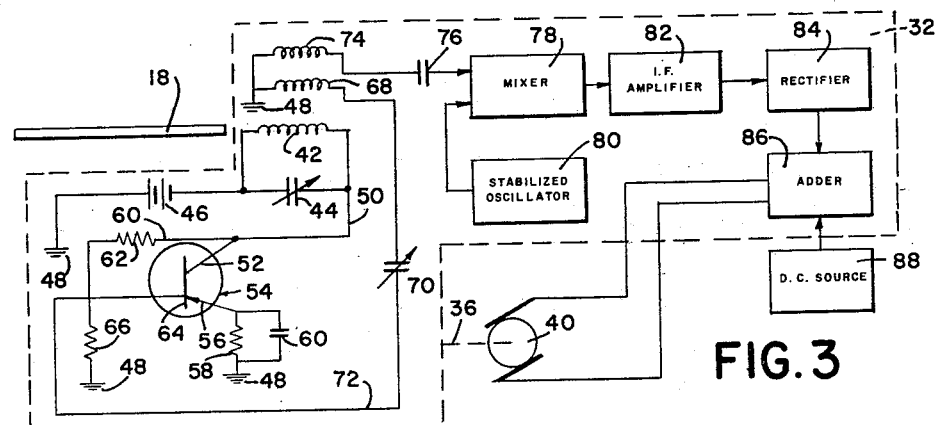
FIG. 3 is a circuit diagram illustrating one form in which the present invention can be applied.

The head member 32 has been outlined in broken lines in FIG. 3 depicting an inductance 42 disposed adjacent to the path 18 traversed by the strip undergoing inspection, a variable capacitance 44 being connected in parallel with the inductance 42 to constitute a resonant circuit. One terminal of the resonant circuit is connected to a terminal of a voltage source 46 whose other terminal is connected to ground 48. The other terminal of the resonant circuit is connected by a lead 50 to the collector 52 of a transistor 54. The emitter 56 of the transistor is connected to a temperature stabilizing circuit composed of a resistor 58 and a capacitor 60 in parallel, which parallel circuit is connected to ground 48. The collector 52 is also connected by means of a lead 60 through a biasing resistor 62 to the base 64 of the transistor 54. The base 64 is also connected by a biasing resistor 66 to ground 48. A winding 68 inductively coupled to the inductance 42 has one terminal connected to ground 48 and its other terminal connected through a variable capacitance 70 and lead 72 to the base 64 of the transistor 54. Another winding 74 inductively coupled to the windings 42 and 68 has one of its terminals connected to ground 48 and its other terminal through a fixed capacitor 76 to the input of a conventional mixer 78 having another input supplied by a stabilized oscillator 80. It will be understood of course, that the windings 42, 68 and 74 combined with the transistor 54 constitute a free running oscillator whose output frequency is a function of the inductance and capacitance of its resonant circuit, which frequency is subject to change due to interaction of the flux produced by the inductance 42 and the structure and position of the strip of metal, magnetic or otherwise, undergoing inspection. Assuming that the output frequency of the free running oscillator is of the order of 1 million cycles per second and the output of the stabilized oscillator 80 is 950,000 cycles per second, the mixer 78 will have outputs corresponding to the sum of the input frequencies and the difference of the input frequencies, namely, 1,950,000 cycles on the one hand and 50,000 cycles per second on the other. A sharply tuned intermediate frequency amplifier 82 will pass only the difference of the frequencies to a rectifier 84 whose output is fed to an adder 86 having another input from a constant source of direct current 88. The adder will combine, algebraically, the inputs from the rectifier 84 and the D.C. source 88 to supply the motor 40 to rotate the screw 36 at a speed and in a direction which will be functions of the flux variations produced by changes in the structure and position of the strip undergoing inspection.

Assuming that the sensing member 32 is at rest while a strip of metal is traversing its path, the free running oscillator will produce a constant frequency so long as the position of the strip edge is unchanged and the structure remains the same. Any changes in the structure or position of the strip undergoing inspection will disturb the flux of the inductance so as to modify the effective value of the inductance and in that way change the frequency and/or amplitude of the output of the free running oscillator supplied to the mixer 78. Such changes will produce corresponding changes in the output of the rectifier 84 so as to control the speed and direction of movement of the motor 40. By supplying the output of the adder 86 to the armature winding of a D.C. motor, the direction of drive can be reversed simply and effectively by properly selecting the value of the direct current source 88 to be algebraically combined with the output of the rectifier 84.

Figure 2:
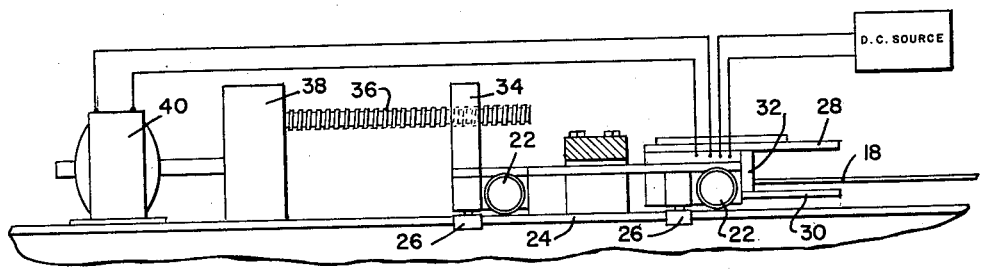
FIG. 2 is a fragmentary elevation of a portion of FIG. 1 on an enlarged scale.
Figure 4:
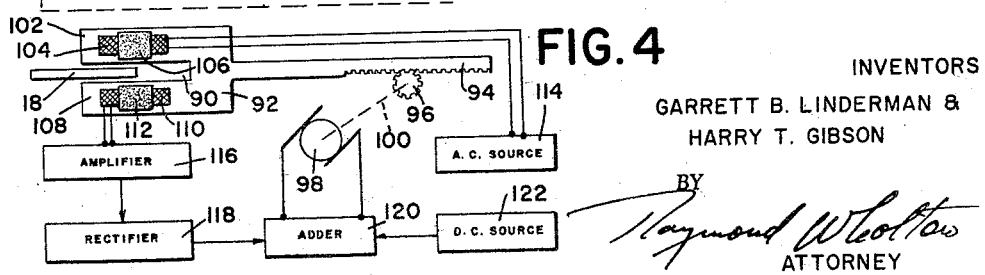
FIG. 4 is a circuit diagram illustrating another form in which the invention is employed.

With reference to the modification illustrated in FIG. 4, each of the opposed edges of the metal strip moving in the path 18 is received in a slot 90 formed in a sensing head 92, carried by a light shield, such as those described in association with FIGS. 1 to 3. Each light shield includes a rack 94 having teeth in mesh with those of a pinion 96 driven by a motor 98 through a shaft 100. The head 92 has an upper leg 102 supporting a winding 104 having a ferromagnetic core 106 and a lower leg 108 supporting a winding 110 also having a ferromagnetic core 112. The upper winding 104 is energized by an alternating current source 114, producing a flux linkage between the windings, as result of which an alternating voltage will be induced in the lower winding 110, the amplitude of the induced voltage varying as the position of the strip changes with respect to the positions occupied by the windings. The output of the winding 110 is supplied to an amplifier 116 whose output is fed to a rectifier 118 which delivers the resulting direct current to an adder 120 where it is algebraically combined with direct current from a constant voltage source 122.

The output of the adder 120 will vary over a range that will reverse the polarity supplied to the windings of the motor 98 so as to change its direction of rotation as required to cause the sensing head to follow the edge of the strip. Whereas very satisfactory results have been achieved with this form of the invention where the alternating current supplied by the source 114 has a frequency between 100 and 800 kilocycles per second, frequencies ranging from 1500 cycles per second to 1 megacycle per second are also contemplated.

Whereas only one specific form of the invention has been described for purposes of illustration, the invention is susceptible to many variations that will be suggested to those skilled in the art and which are contemplated by the appended claims.

We claim:
1. In combination with a pinhole detector having a frame providing a path to be traversed by a strip of metal and having a light source and a light sensitive device substantially aligned on opposite sides of said path; a light shield transversely movably mounted with respect to said path, a reversible motor carried by said frame, means connecting said motor in driving relationship with said shield to impart movement to said shield, an electrical circuit including said motor and a variable source of energy, magnetic flux producing and sensing means carried by said shield proximate to an edge of said strip, and a circuit including said sensing means controlling said source of energy to produce movement of said shield transversely of said path as a function of variations in flux produced by variations in the position and structure of said strip.

2. The invention according to claim 1 wherein said flux producing and sensing means includes an inductance energized to produce magnetic flux.

3. The invention according to claim 2 wherein said inductance is included in an oscillator circuit.

4. The invention according to claim 3 wherein said oscillator circuit and a stabilized oscillator have outputs connected to a mixer having an output determining the speed and direction of movement of said motor.

5. The invention according to claim 3 wherein said oscillator circuit operates at a frequency selected from the range of from one to sixty megacycles.

6. The invention according to claim 5 wherein said frequency is selected from the range of from three to six megacycles.

References Cited in the file of this patent

UNITED STATES PATENTS

| | | |
|---|---|---|
| 2,400,447 | Wells et al. | May 14, 1946 |
| 2,820,908 | Linderman | Jan. 21, 1958 |
| 2,981,845 | Larew et al. | Apr. 25, 1961 |
| 2,989,690 | Cook | June 20, 1961 |